3,226,177
PROCESS FOR THE DYEING OF POLYOLEFIN FIBROUS MATERIALS
Yutaka Hosoda and Juichi Shimatani, Tokyo, and Koji Sakuma, Matsudo-shi, Chiba-ken, Japan, assignors to Mitsui Kagaku Kogyo Kabushiki Kaisha, Tokyo, Japan, a corporation of Japan
No Drawing. Filed Nov. 26, 1962, Ser. No. 240,140
Claims priority, application Japan, Dec. 2, 1961, 36/43,896; July 24, 1962, 37/31,225, 37/31,226
3 Claims. (Cl. 8—39)

This invention relates to a process for the dyeing of fibrous materials of polyolefin such as polyethylene and polypropylene.

The dyeing of polyolefin is generally difficult, above all blue dyeing of this substance is more difficult, these difficulties are ascribed to the fact that usual dyes have little affinity for this substance, and especially to the lack of suitable blue dyes for the dyeing of this substance.

It has now been found that the fibrous materials of polyolefin can be dyed in the shades from red to blue with good fastness by the use of certain disperse dyes of anthraquinone type.

This invention provides a process for the dyeing of polyolefin fibrous materials characterized by the use of anthraquinone disperse dyes having the following general Formula I,

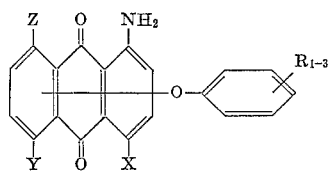

(I)

wherein X indicates a hydroxy or an amino group, Y and Z indicate hydrogen atoms or any one of them indicates a hydroxy-group and then the other indicates an amino-group, and the amino-groups should be within two in whole number in which one can be replaced with methylamino or methylolamino group; R indicates hydrogen atom, cycloalkyl or alkyl group, but the whole number of carbon atoms in all of these groups which attach to the benzene nucleus should be within 12, and the number should be from 3 to 12 especially when Y and Z are both hydrogen atoms, and any hydrogen atoms of unsubstituted positions of anthraquinone and benzene nucleus in the Formula I can be substituted by halogen atom.

The dyes used according to this invention can be prepared from the anthraquinone compounds corresponding to compounds in which the phenoxy-group of said general Formula I is replaced with halogen atom and from phenol derivatives corresponding to the phenoxy group of said general Formula I by heating and etherification under the existence of acid fixing agents such as caustic alkali.

It has now been found that β-halogen-substituted or unsubstituted anthraquinone compounds which correspond to the synthetic starting material of the dye used by this invention are used for dyeing of polyester fiber, indicate only very poor coloring power for polyolefin, but the power increases when these compounds are substituted at β-position by phenoxy group, and furthermore effectiveness is produced by introduction of alkyl or cycloalkyl group into the benzene nucleus of the phenoxy group. The alkyl groups herein introduced are generally preferably cyclic or branched hydrocarbons containing within 9 carbon atoms in all, but they can be practically used even consisting of 12 carbon atoms and straight hydrocarbon chain.

The dyes to be used by this invention vary the dyeing shades for polyolefins depending on the chemical structure. That is, polyolefins are dyed in red or violet according to whether X is hydroxyl or amino-group when Y and Z are both hydrogen atoms, and in blue when X is hydroxyl group and any one of Y and Z is amino group and the other is hydroxyl group in the general Formula I, and in this case the best coloring power is obtained by replacing one of the two amino groups with methylamino group.

The color fastness of dyed polyolefin by the process of this invention are generally good, and the dyes used by this invention are distinguished by the better light fastness from the other known dyes for polyolefin, for example which contain a long chain alkyl group attached directly to the α-amino group of an anthraquinone nucleus as shown in British Patent No. 872,882.

The dyeing of the polyolefin fibrous materials by this invention can be carried out in the same manner of usual disperse dyes, that is, dispersing the anthraquinone dye shown in the general Formula I in water with some dispersing agents such as sodium salt of dinaphthylmethandisulfonic acid and polyoxyethylene alkylether and the like and immersing the fibrous materials in the prepared dispersed system.

It is of advantage in order to prepare the dyeing bath to use the fine standardized dyes which are prepared by grinding together with dispersing agents, or by pouring the dye solution in an organic solvent such as acetone and alcohol into water which contains the dispersing agents.

The dyeing temperature in the dyeing bath may be selected suitably depending on the kind of the polyolefins, that is in the case of polypropylene higher temperature may be desirable, for instance, at the boiling point or about 120 C. under pressure, but in the case of polyethylene it may be under the boiling point.

It is of advantage, especially when polyolefin fabrics are dyed to apply the so-called Thermosol process, which is carried out in the dyeing of polyester fabrics. Thus, polypropylene fabrics are padded with aqueous dispersion or organic solution of the dyes used by this invention and thereafter subjected to dry heating at 120–135° C.

The process of this invention can be applied in the same manner as described above to the improved dyable polyolefin fibers blended with epoxy resin made from bisphenol A and epichlorohydrin to obtain deeper and more brilliant shades.

A further interesting fact is that an after-treatment with certain metallic salts can be effectively applied to the polyolefin fibrous materials dyed by the process of this invention. The shade becomes deeper and faster by heating the dyed materials in an aqueous solution of organic or inorganic salts of metals such as cobalt, chromium, iron and copper.

The following examples are given to illustrate the invention. Percents are shown by weight.

*Example 1*

A composition consisting of 10 g. of the fine standardized dye of the formula:

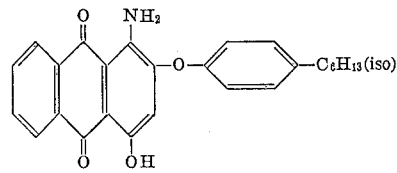

5 g. of sodium salt of dinaphthylmethandisulfonic acid and 35 g. of water is prepared by mixing the reprecipitated dye and the dispersing agent and grinding them. 10 g. of polypropylene fiber are immersed in the dyeing bath which is made by adding 0.5 g. of the composition into 300 g. of water containing 0.6 g. of sulfonic acid ester of lauryl alcohol, the bath is kept at boiling temperature for 1 hour, then the material is soaped, rinsed and dried. A pink shade with good fastness is obtained.

By proceeding as described above, but employing polypropylene fibers blended with 3% of epoxy resin, a deeper and more brilliant shade is obtained.

On the contrary when 1-amino-2-phenoxy-4-hydroxyanthraquinone is used as the dye, the fibers are not dyed with a sufficient intensity.

*Example 2*

By operating as described in Example 1, but using the following dye:

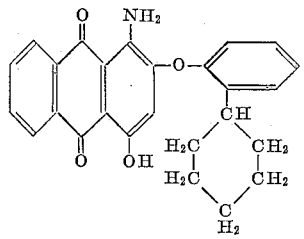

a brilliant pink shade with good fastness is obtained.

*Example 3*

By operating as described in Example 1, but using the following dye:

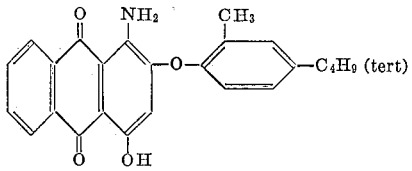

a pink shade is obtained.

*Example 4*

By operating as described in Example 1, but using the following dye:

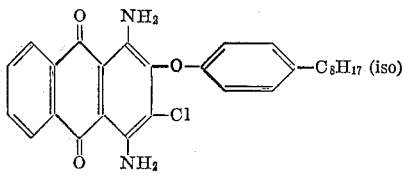

a violet shade with very good fastness to light is obtained.

On the contrary when 2,3-dichloro-1,4-diaminoanthraquinone which is the intermediate of the above dye and used for the dyeing of polyester fiber, is used as the dye, the fibers are not dyed with a sufficient intensity.

*Example 5*

By operating as described in Example 1, but using the following dye:

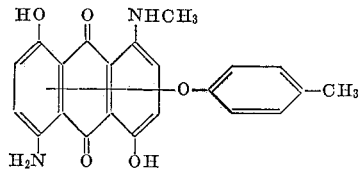

a blue shade with good fastness is obtained.

*Example 6*

By operating as described in Example 1, but using the following dye:

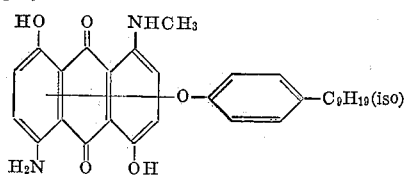

a blue shade with good fastness is obtained.

*Example 7*

By operating as described in Example 1, but using the following dye:

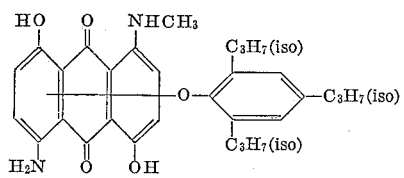

a blue shade with good fastness is obtained.

*Example 8*

By operating as described in Example 1, but using the following dye:

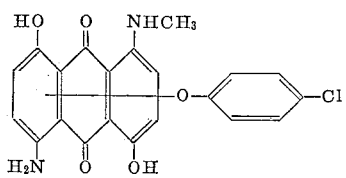

a blue shade is obtained.

*Example 9*

By operating as described in Example 1, but using the following dye:

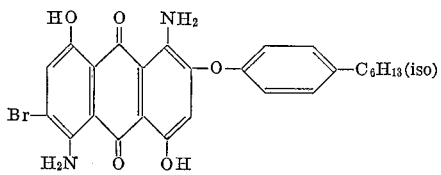

a blue shade is obtained.

On the contrary, using 1,5-diamino-4,8-dihydroxy-2-bromoanthraquinone which is used for the blue dyeing of polyester fibers, the polypropylene fibers are not dyed with a sufficient intensity.

*Example 10*

By operating as described in Example 1, but using the following dye:

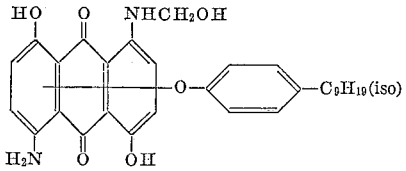

a blue shade is obtained.

*Example 11*

By operating as described in Example 1, but using the following dye:

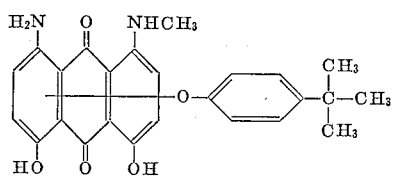

a blue shade is obtained.

Example 12

A polypropylene fabric is passed through 1% acetone solution of the dye used in Example 1 and dried, then heated in an oven at 125–130° C. for 3 minutes and soaped. The fabric is dyed with more intensity than the material dyed in Example 1.

Example 13

By operating as described in Example 12, but using 1% 1,2-dichloropropane solution of the dye used in Example 6, a blue shade with more intensity than Example 6 is obtained.

Example 14

The dyed fabric obtained in Example 12 is boiled in an aqueous solution containing 0.1% chromium acetate for 30 minutes, then rinsed and dried. The shade becomes bluer and faster to light compared with the untreated fabric.

What is claimed is:

1. A process for the dyeing of polyolefin fibrous material which comprises dyeing polyolefin fibrous material with an anthraquinone disperse dye having the formula:

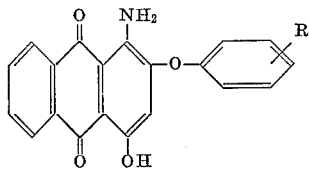

wherein R is a member selected from the group consisting of —$C_6H_{13}$(iso) and cyclohexyl.

2. A process for the dyeing of polyolefin fibrous material which comprises dyeing polyolefin fibrous material with an anthraquinone disperse dye having the formula:

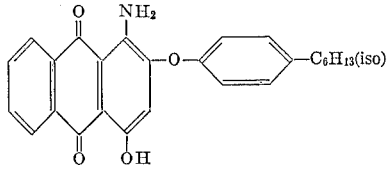

3. A process for the dyeing of polyolefin fibrous material which comprises dyeing polyolefin fibrous material with an anthraquinone disperse dye having the formula:

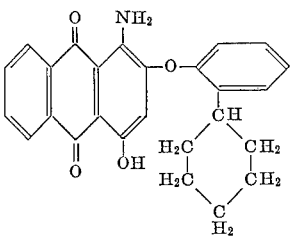

References Cited by the Examiner

UNITED STATES PATENTS

| | | | |
|---|---|---|---|
| 2,580,190 | 12/1951 | Peter et al. | 260—380 XR |
| 2,984,634 | 5/1961 | Caldwell et al. | 8—55 |
| 3,092,435 | 6/1963 | Tessandori | 8—55 |
| 3,097,044 | 7/1963 | Skeuse | 8—55 |

FOREIGN PATENTS

| | | |
|---|---|---|
| 1,216,320 | 11/1959 | France. |
| 1,262,253 | 4/1961 | France. |
| 317,471 | 1/1957 | Switzerland. |

NORMAN G. TORCHIN, *Primary Examiner.*